United States Patent
Portell et al.

(10) Patent No.: US 7,278,525 B2
(45) Date of Patent: Oct. 9, 2007

(54) INTERNALLY AND EXTERNALLY SPLINED CLUTCH HUB FOR TORQUE-TRANSMITTING MECHANISMS IN A POWER TRANSMISSION

(75) Inventors: Patrick S. Portell, Pinckney, MI (US); Teodor Mostior, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 106 days.

(21) Appl. No.: 11/050,596

(22) Filed: Feb. 3, 2005

(65) Prior Publication Data

US 2006/0011444 A1  Jan. 19, 2006

Related U.S. Application Data

(60) Provisional application No. 60/589,186, filed on Jul. 19, 2004.

(51) Int. Cl.
F16D 25/10 (2006.01)
F16D 13/68 (2006.01)

(52) U.S. Cl. .................. 192/87.11; 192/48.8; 192/70.2

(58) Field of Classification Search .............. 192/70.2, 192/87.1, 87.11, 87.15; 475/146, 318
See application file for complete search history.

(56) References Cited

U.S. PATENT DOCUMENTS

| | | | | |
|---|---|---|---|---|
| 3,365,985 A | * | 1/1968 | Johnson | 475/146 |
| 3,596,537 A | * | 8/1971 | Koivunen | 475/146 |
| 3,747,727 A | * | 7/1973 | Dach et al. | 192/18 A |
| 3,922,932 A | * | 12/1975 | Maurice et al. | 475/284 |
| 4,732,253 A | * | 3/1988 | Hiramatsu et al. | 192/87.11 |
| 4,759,432 A | * | 7/1988 | Jurgens et al. | 192/85 AA |
| 5,860,885 A | * | 1/1999 | Mizuta | 475/116 |
| 2005/0103594 A1 | * | 5/2005 | Tiesler et al. | 192/87.11 |

FOREIGN PATENT DOCUMENTS

| JP | 06257669 A | * | 9/1994 |
|---|---|---|---|
| WO | WO 02/40900 A2 | * | 5/2002 |

* cited by examiner

Primary Examiner—Richard M Lorence

(57) ABSTRACT

A transmission assembly in accordance with the invention includes a plurality of torque-transmitting mechanisms. A hub member of the assembly includes a radially extending wall, and a circumferentially extending wall formed integrally with the radially extending wall. The circumferentially extending wall includes a first plurality of internal splines, a second plurality of external splines spaced with the internal splines, and a cylindrical end portion at a distal end of the hub and terminating both the internal splines and the external splines to prevent failure in high speed operations. A plurality of clutch plates associated with one of the plurality of torque-transmitting mechanisms are splined to the external splines of the hub member, and a plurality of clutch plates associated with another one of the plurality of torque-transmitting mechanisms are splined to the internal splines of the hub member.

3 Claims, 2 Drawing Sheets

INTERNALLY AND EXTERNALLY SPLINED CLUTCH HUB FOR TORQUE-TRANSMITTING MECHANISMS IN A POWER TRANSMISSION

CROSS-REFERENCE TO RELATED APPLICATION

This application claims the benefit of U.S. Provisional Application 60/589,186 filed Jul. 19, 2004, which is hereby incorporated by reference.

TECHNICAL FIELD

This invention relates to torque-transmitting mechanisms for power transmissions and, more particularly, to torque-transmitting mechanisms having an input housing and an output hub.

BACKGROUND OF THE INVENTION

Torque-transmitting mechanisms having input housings and output hubs with friction devices splined therebetween, which are selectively engaged to provide a torque-transmitting relationship between the input housing and the hub, are employed to establish either an input drive to a planetary gearset or a reaction member for a planetary gearset.

The hub member is generally connected with the planetary gear member and may be splined internally and externally to accommodate both a rotating torque-transmitting mechanism and a stationary torque-transmitting mechanism. These hubs, which have been used, have spline members, which are formed on the full length of an outer cylindrical portion of the hub. These prior art hub members are subject to centrifugal forces or hoop stresses on the cylindrical extension of the hub, which may lead to distortion of the member and inaccurate operation of the torque-transmitting mechanism.

SUMMARY OF THE INVENTION

The present invention provides an improved torque-transmitting mechanism having an internally and externally splined hub member.

In one aspect of the present invention, the hub member has a radially extending hub and an axially extending cylindrical wall.

In another aspect of the present invention, the axially extending cylindrical wall has splines formed internally and externally on the cylindrical wall. The splines terminate in a continuous cylindrical member at the distal end of the hub member. The continuous cylindrical member strengthens the hub member and allows high speed operation without failure.

In yet another aspect of the present invention, the cylindrical wall has a continuous cylindrical member at the distal end thereof.

In still another aspect of the present invention, the external splined portion of the hub accepts the splines of a friction plate from the radial hub side of the hub.

In yet still another aspect of the present invention, the internal spline member accepts spline teeth of friction plates from the cylindrical end of the hub.

A transmission assembly in accordance with the invention includes a plurality of torque-transmitting mechanisms. A hub member of the assembly includes a radially extending wall, and a circumferentially extending wall formed integrally with the radially extending wall. The circumferentially extending wall includes a first plurality of internal splines, a second plurality of external splines spaced with the internal splines, and a cylindrical end portion at a distal end of the hub and terminating both the internal splines and the external splines. A plurality of clutch plates associated with one of the plurality of torque-transmitting mechanisms are splined to the external splines of the hub member, and a plurality of clutch plates associated with another one of the plurality of torque-transmitting mechanisms are splined to the internal splines of the hub member.

The above features and other features and advantages of the present invention are readily apparent from the following detailed description of the invention when taken in connection with the drawings.

DESCRIPTION OF AN EXEMPLARY EMBODIMENT

Figure 1:
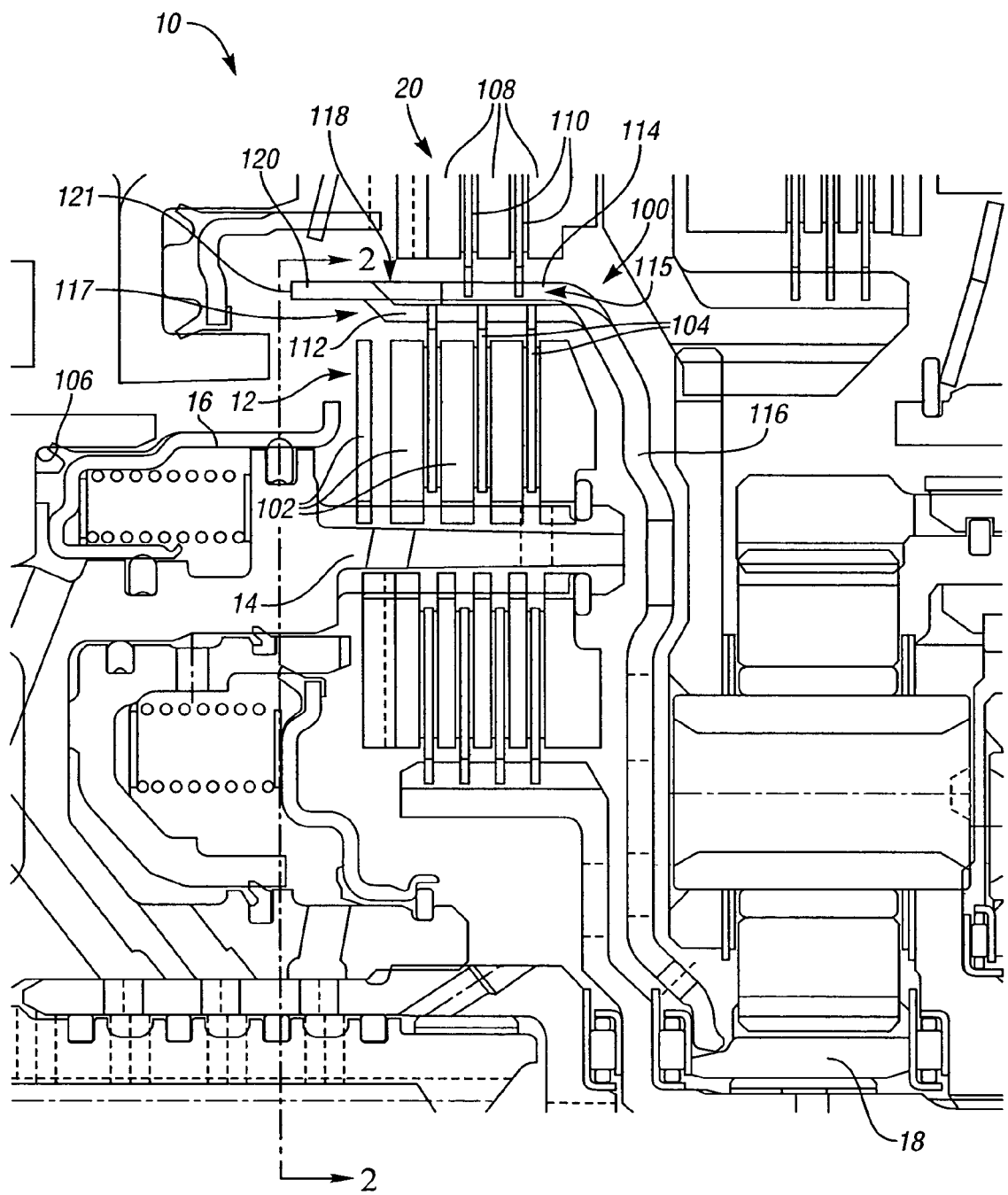
FIG. 1 is a partial cross-sectional view depicting the torque-transmitting mechanisms within a transmission assembly in accordance with the invention.
Figure 2:
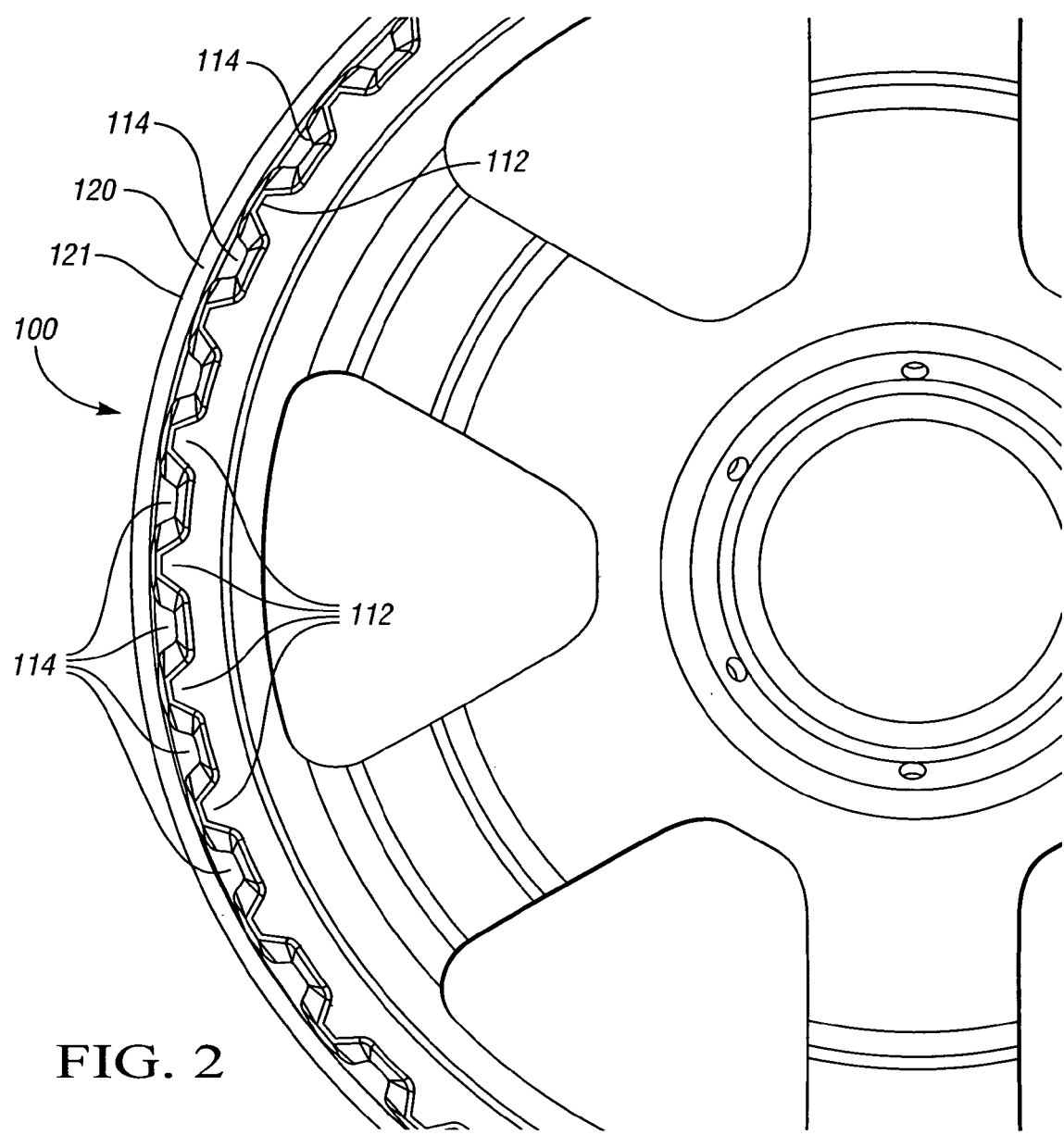
FIG. 2 is a partial view taken along line 2-2 of FIG. 1.

Referring to the drawings, wherein like characters represent the same or corresponding parts throughout the several views, there is seen in FIGS. 1 and 2 a hub member 100, which is a component of the second and third torque-transmitting mechanisms of a transmission assembly 10. The (second) torque-transmitting mechanism 12 includes the input clutch hub 14, a plurality of friction plates 102 splined with the input clutch hub 14, and a plurality of friction plates 104 splined with the hub 100.

The apply piston 16 is slidably disposed in a chamber 106 formed in the input clutch hub 14, which when filled with pressurized fluid will enforce engagement of the friction plates 102 and 104 thereby providing a torque-transmitting mechanism 12 between the input clutch hub 14 and the (third) sun gear member 18 through the hub 100.

The (third) torque-transmitting mechanism 20 has a plurality of friction plates 108 splined to the transmission case (not shown) and a plurality of friction plates 110 splined to the hub 100. The hub 100 has internal splines 112, which drivingly engage the friction plates 104 and external splines 114, which drivingly engage the friction plates 110.

The hub 100 also includes a radial portion 116 and a cylindrical portion 118, which includes the spline portions 112 and 114. The cylindrical portion 118 also has a continuous cylindrical end 120, which is formed at the distal end of the splines 112 and 114 to establish or form a continuous cylindrical ring portion 121 on the hub 100. The external splines 114 have an axially unobstructed entry path 115 proceeding from the radial portion 116 of the hub and the internal splines 112 have an axially unobstructed entry path 117 presented at the distal end of said internal spline 112. These entry paths enable axial insertion of the friction plates 104 into the hub via the internal splines 112, and axial sliding movement of the friction plates 110 onto the external splines 114. These entry paths also prevent a die-lock situation in manufacturing the hub, in that opposing halves of a forming tool may move toward and away from each other without obstruction from the hub when the hub is formed.

As best seen in FIG. 2, the spline teeth 112 are alternately spaced by the spline teeth 114 and the cylindrical end 120 extends axially from the distal end of the spline teeth 114. The internal and external splines 112, 114 are formed contiguously in the cylindrical portion 118 of the hub 100. The cylindrical end 120 adds mass and inertia to the hub 100, which prevents slowing of the hub 100 during high-speed operation of the power transmission 10. The cylindrical end 120 adds strength to and stabilizes the hub 100 to accommodate hoop stresses and to provide an improved drive mechanism supporting both internally and externally splined members. The cylindrical end 120 allows high speed operation of the hub 100 without failure. Without the cylindrical end 120, the splines 112, 114 would likely cause the hub 100 to open up under high hoop stresses.

While the best mode for carrying out the invention has been described in detail, those familiar with the art to which the invention relates will recognize various alternative designs and embodiments for practicing the invention within the scope of the appended claims.

The invention claimed is:

1. A hub member in a torque-transmitting mechanism comprising:
   a radially extending wall; and
   a circumferentially extending wall formed integrally with said radially extending wall;
   said circumferentially extending wall including a first plurality of internal splines, a second plurality of external splines spaced with said internal splines, and a continuous cylindrical end portion at a distal end of said hub and extending beyond both the internal splines and the external splines, said cylindrical end portion forming a free end of the hub member that is configured for added strength and stabilization of the hub member to accommodate hoop stresses;
   wherein said external splines have a first unobstructed entry path proceeding from said radially extending wall of said hub and configured to enable axial insertion of a first set of friction plates into said hub via said external splines, and wherein said internal splines have a second unobstructed entry path presented at the distal end of said hub member and configured to enable axial sliding movement of a second set of friction plates onto said internal splines, wherein said unobstructed entry paths are unobstructed by said continuous cylindrical end portion, and wherein said second set of friction plates is compressed in the direction of said radially extending wall when the torque-transmitting mechanism is actuated.

2. A transmission assembly including a first and second torque-transmitting mechanisms, the assembly comprising:
   a hub member including a radially extending wall, and a circumferentially extending wall formed integrally with said radially extending wall, said circumferentially extending wall including a first plurality of internal splines, a second plurality of external splines alternately spaced with said internal splines, and a continuous cylindrical end portion forming a free end at a distal end of said hub member, and extending beyond both the internal splines and the external splines for added strength and stabilization of the hub member to accommodate hoop stresses;
   wherein said external splines have a first unobstructed entry path proceeding from said radially extending wall of said hub member and configured to enable axial insertion of a first set of clutch plates into said hub via said external splines, and wherein said internal splines have a second unobstructed entry path presented at the distal end of said hub member and configured to enable axial sliding movement of a second set of clutch plates onto said internal splines; and
   wherein said first set of clutch plates is associated with the first torque-transmitting mechanism and is splined to said external splines, and said second set of clutch plates is associated with the second torque-transmitting mechanism and is splined to said internal splines, said second set of clutch plates being compressed in the direction of said radially extending wall when the second torque-transmitting mechanism is actuated.

3. A clutch hub for a transmission comprising:
   a hub body having internal splines mated to a first set of clutch plates positioned inside said hub, and having external splines mated with a second set of clutch plates positioned outside said hub body, wherein said internal and external splines are formed contiguously in said hub body;
   wherein said hub body includes a radially extending wall and a circumferentially extending wall formed integrally with said radially extending wall, said circumferentially extending wall including said internal and external splines, and a cylindrical end portion forming a continuous cylindrical free end on said hub body at a distal end of said hub body, and extending beyond both the internal splines and the external splines to prevent failure in high-speed operation;
   wherein said external splines have an entry path proceeding from said radially extending wall of said hub body and said internal splines have an entry path presented at the distal end of said hub body, wherein said entry paths are unobstructed by said continuous cylindrical free end; and
   wherein said first set of clutch plates are compressible in the direction of said radially extending wall.

* * * * *